United States Patent
McEnroe et al.

(10) Patent No.: US 7,634,652 B2
(45) Date of Patent: Dec. 15, 2009

(54) MANAGEMENT OF STREAMING CONTENT

(75) Inventors: Elizabeth Rose McEnroe, Palo Alto, CA (US); Mark Wagner, Seattle, WA (US); Peter J. Potrebic, Calistoga, CA (US); Thomas H. Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 11/275,530

(22) Filed: Jan. 12, 2006

(65) Prior Publication Data

US 2007/0162392 A1   Jul. 12, 2007

(51) Int. Cl.
*H04L 9/00* (2006.01)

(52) U.S. Cl. .................... 713/153; 713/163

(58) Field of Classification Search .............. 707/3, 707/101; 455/426; 709/219
See application file for complete search history.

(56) References Cited

U.S. PATENT DOCUMENTS

| | | | |
|---|---|---|---|
| 5,583,995 A | 12/1996 | Gardner et al. | |
| 5,854,887 A | 12/1998 | Kindell et al. | |
| 5,901,148 A | 5/1999 | Bowen et al. | |
| 5,940,738 A | 8/1999 | Rao | |
| 6,125,396 A | 9/2000 | Lowe | |
| 6,133,910 A | 10/2000 | Stinebruner | |
| 6,466,978 B1 | 10/2002 | Mukherjee et al. | |
| 6,510,556 B1 | 1/2003 | Kusaba et al. | |
| 6,538,656 B1 | 3/2003 | Cheung et al. | |
| 6,795,707 B2 | 9/2004 | Martin et al. | |
| 6,839,070 B2 | 1/2005 | Meandzija et al. | |
| 6,965,770 B2 * | 11/2005 | Walsh et al. | 455/426.1 |
| 6,973,038 B1 | 12/2005 | Narendran | |
| 7,068,674 B1 | 6/2006 | Jang et al. | |
| 7,337,233 B2 | 2/2008 | Dillon | |
| 7,366,199 B1 | 4/2008 | Vaughan et al. | |
| 7,380,264 B2 | 5/2008 | Potrebic | |
| 2001/0034649 A1 | 10/2001 | Acres | |
| 2001/0049715 A1 | 12/2001 | Kidder | |
| 2002/0083187 A1 * | 6/2002 | Sim et al. | 709/235 |
| 2002/0087696 A1 | 7/2002 | Byrnes | |
| 2002/0097750 A1 * | 7/2002 | Gunaseelan et al. | 370/503 |
| 2002/0112247 A1 * | 8/2002 | Horner et al. | 725/112 |
| 2002/0126698 A1 | 9/2002 | Deshpande | |
| 2002/0133537 A1 | 9/2002 | Lau et al. | |
| 2002/0133589 A1 | 9/2002 | Gubbi et al. | |
| 2003/0009452 A1 * | 1/2003 | O'Rourke et al. | 707/3 |
| 2003/0041164 A1 | 2/2003 | Denecheau et al. | |
| 2003/0048801 A1 | 3/2003 | Sala et al. | |
| 2003/0050058 A1 * | 3/2003 | Walsh et al. | 455/426 |

(Continued)

FOREIGN PATENT DOCUMENTS

KR   20050015528 A   2/2005

(Continued)

OTHER PUBLICATIONS

PCT Search Report for International Application No. PCT/US2006/047274, mailed Apr. 19, 2007 (10 pages).

*Primary Examiner*—Evens J Augustin
(74) *Attorney, Agent, or Firm*—Lee & Hayes, PLLC

(57) ABSTRACT

Embodiments of streaming content management are described herein. For example, techniques may be employed to manage streams received by client devices such that the client devices may receive content and share functionality.

16 Claims, 7 Drawing Sheets

U.S. PATENT DOCUMENTS

| | | |
|---|---|---|
| 2003/0069964 A1 | 4/2003 | Shteyn et al. |
| 2003/0086413 A1 | 5/2003 | Tartarelli et al. |
| 2003/0093548 A1* | 5/2003 | Cinghita et al. ............. 709/231 |
| 2003/0115294 A1 | 6/2003 | Hoang |
| 2003/0158890 A1 | 8/2003 | Miller et al. |
| 2003/0177179 A1 | 9/2003 | Jones et al. |
| 2003/0195977 A1 | 10/2003 | Liu et al. |
| 2003/0204848 A1 | 10/2003 | Cheng et al. |
| 2003/0204853 A1 | 10/2003 | Fries et al. |
| 2003/0233540 A1* | 12/2003 | Banerjee et al. ............. 713/153 |
| 2004/0039834 A1 | 2/2004 | Saunders et al. |
| 2004/0125779 A1 | 7/2004 | Kelton et al. |
| 2004/0163130 A1 | 8/2004 | Gray et al. |
| 2004/0187152 A1 | 9/2004 | Francis et al. |
| 2004/0255323 A1 | 12/2004 | Varadarajan et al. |
| 2005/0005300 A1 | 1/2005 | Putterman et al. |
| 2005/0041595 A1 | 2/2005 | Uzun et al. |
| 2005/0076127 A1 | 4/2005 | Wilson et al. |
| 2005/0102698 A1 | 5/2005 | Bumgardner et al. |
| 2005/0120102 A1 | 6/2005 | Gandhi et al. |
| 2005/0138621 A1 | 6/2005 | Clark et al. |
| 2005/0138663 A1 | 6/2005 | Throckmorton et al. |
| 2005/0138668 A1 | 6/2005 | Gray et al. |
| 2005/0172315 A1 | 8/2005 | Chen |
| 2005/0188415 A1 | 8/2005 | Riley |
| 2005/0198097 A1 | 9/2005 | Kalnitsky |
| 2005/0198662 A1 | 9/2005 | Endo et al. |
| 2005/0213503 A1 | 9/2005 | Guo et al. |
| 2005/0223232 A1 | 10/2005 | Anderson et al. |
| 2005/0251566 A1* | 11/2005 | Weel ......................... 709/219 |
| 2005/0289618 A1 | 12/2005 | Hardin |
| 2006/0010003 A1 | 1/2006 | Kruse |
| 2006/0020960 A1* | 1/2006 | Relan et al. ................... 725/30 |
| 2006/0031887 A1 | 2/2006 | Sparrell et al. |
| 2006/0053452 A1 | 3/2006 | Lee et al. |
| 2006/0064729 A1 | 3/2006 | Steading |
| 2006/0098618 A1 | 5/2006 | Bouffioux |
| 2006/0120385 A1 | 6/2006 | Atchison et al. |
| 2006/0126507 A1 | 6/2006 | Nakayasu |
| 2006/0171390 A1 | 8/2006 | La Joie |
| 2006/0179408 A1 | 8/2006 | Ko |
| 2006/0190589 A1* | 8/2006 | Parker ........................ 709/224 |
| 2006/0195464 A1 | 8/2006 | Guo |
| 2006/0200412 A1 | 9/2006 | Fahrny et al. |
| 2006/0215558 A1 | 9/2006 | Chow |
| 2006/0235883 A1 | 10/2006 | Krebs |
| 2007/0039033 A1 | 2/2007 | Ota |
| 2007/0089057 A1* | 4/2007 | Kindig ...................... 715/716 |
| 2007/0104146 A1 | 5/2007 | Hossain et al. |
| 2007/0162502 A1* | 7/2007 | Thomas et al. ........... 707/104.1 |
| 2007/0174883 A1 | 7/2007 | McEnroe et al. |
| 2008/0034391 A1 | 2/2008 | Lehman et al. |
| 2008/0133701 A1 | 6/2008 | Kazmi et al. |
| 2008/0301736 A1 | 12/2008 | Heilbron et al. |

FOREIGN PATENT DOCUMENTS

| | | |
|---|---|---|
| WO | WO2005122025 A2 | 12/2005 |

* cited by examiner

MANAGEMENT OF STREAMING CONTENT

BACKGROUND

Traditionally, in order to receive television programs, users were limited to broadcasts of the television programs that were received via antennas, from cable providers, and so on. For example, the user may have configured a traditional "over-the-air" antenna, connected a cable to a television set, and so on to receive broadcasts of television programs.

Today, however, users are consistently exposed to ever greater varieties and amounts of content. For example, users may now receive and interact with pay-per-view (PPV) content (e.g., movies and sporting events), video-on-demand (VOD), video games, and so on. Additionally, users are continually be exposed to content having an ever increasing "richness", such as that experienced in a transition from standard-definition content to enhanced-definition content to high-definition content, and so on.

Providing this content to the users, however, may consume a significant amount of bandwidth. For example, a content provider may provide multiple streams of content to hundreds and thousands of locations, e.g., households. Therefore, to ensure that each household may receive content as desired, the content provider may allocate portions of the content to each household. However, each household may be able to consume more content than that which is allocated, which may lead to user frustration when not properly managed, thereby adversely affecting the user's experience with this content.

SUMMARY

Techniques are described for management of streaming content. In an implementation, an architecture includes a manager client device and a remote client device that are each configured to receive content from a content provider. The remote client device receives content directly from the content provider and streams the content to the manager client device. The manager client device obtains content from the content provider that matches the content received from the remote client device. Upon receipt of a request for the content from the client device, the content received from the content provider is streamed to the remote client device, such as to perform a time-shifting operation. A variety of other implementations are also contemplated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Figure 1:
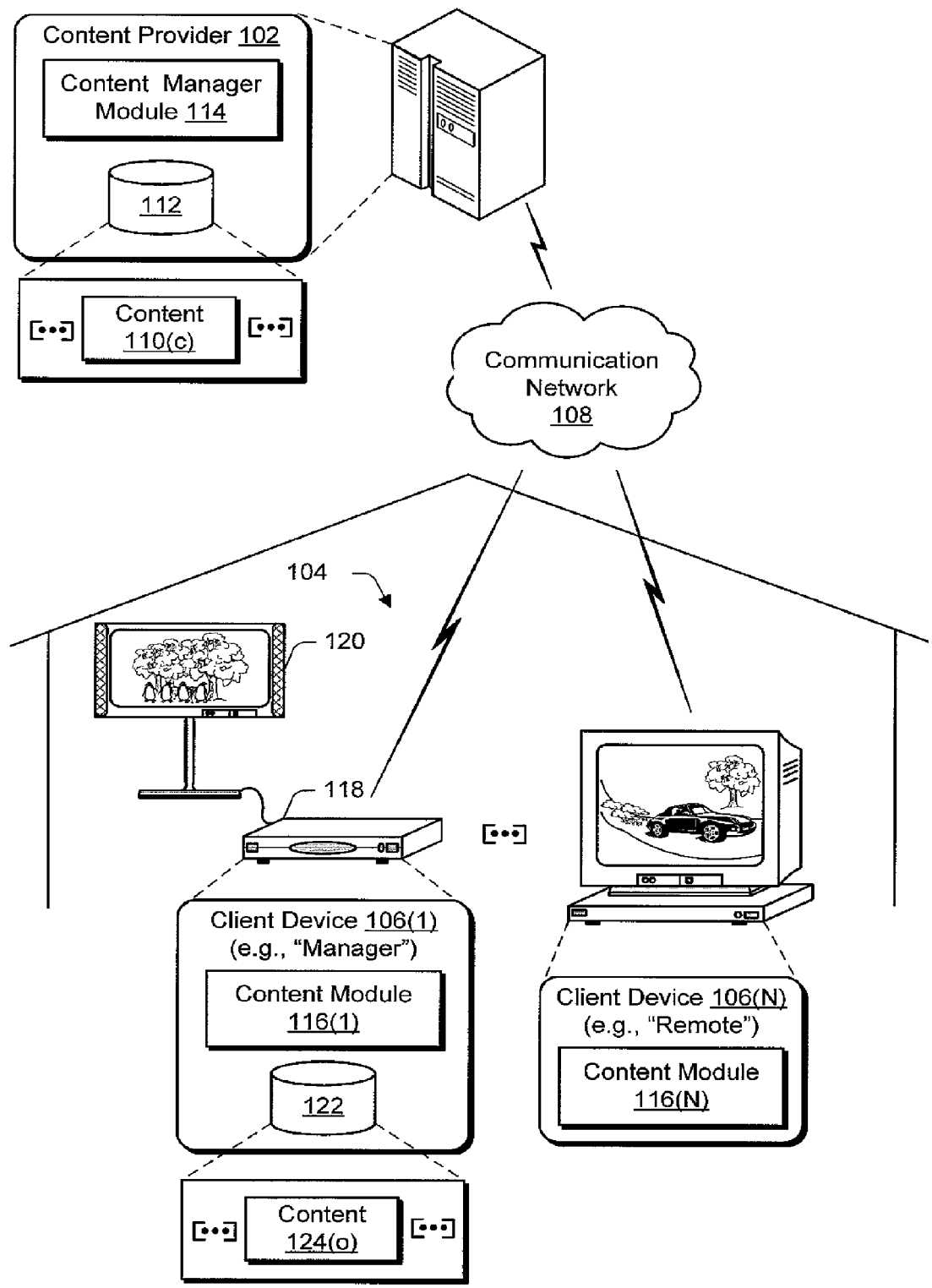
FIG. 1 is an illustration of an environment in an exemplary implementation that is operable to employ streaming content management techniques.

Users are continually exposed to ever increasing amounts and varieties of content. Additionally, the types of techniques which may be employed to interact with this content are also increasing. For example, the functionality available from client devices employed at a location (e.g., a household) to consume content may be different, one to another. Techniques may be employed, however, to "share" this functionality between the client devices.

A manager client device, for instance, may include storage which allows for storage of content received from a content provider via a communication network. As previously described, storage may be utilized to provide a wide variety of functionality, such as to "time shift" an output of the content to provide "trick modes, e.g., to "pause" an output of streamed content. A remote client device, however, by itself may not have access to such storage and therefore the remote client device renders content as it is received and does not have the ability to time shift an output of the content.

In order to enable the remote client device to have access to this functionality, the manager client device may store content for the remote client device. The manager client device may then stream this content to the remote client device for rendering. In this way, the remote client device may communicate with the manager client device to receive content and to employ storage available via the manager client device to provide corresponding functionality, e.g., time-shifting content received from the manager client device.

Techniques may also be employed to manage provision of content to the client devices such that the remote client devices may navigate to different content in an efficient manner yet still avail itself of functionality provided by other client devices. For example, the remote client device may receive content directly from the content provider and provide this content to the manager client device for storage. The manager client device may then contact the content provider to also receive the content, which is then streamed to both the remote client device and the manager client device. Upon receipt of the streamed content at the manager client device, the content received from the content provider is stored instead of the content received from the remote client device. In other words, the stream of content received from the content provider replaces the stream of content received from the remote client device.

The manager client device may then stream this content to the remote client device, which renders the content received from the manager client device instead of the content received directly from the content provider. Therefore, the remote client device may communicate with the manager client device to use time-shifting operations, such as to employ one or more "trick modes" to "rewind" content currently being streamed, "pause" an output of streamed content, and so on. In this way, the remote client device may efficiently receive content streamed from a content provider yet still have access to functionality provided by other client devices.

In the following discussion, an exemplary environment is described in relation to FIGS. 1, 3 and 5-7 which is operable to content management techniques. Exemplary procedures are described in relation to FIGS. 2-4 which may be implemented by the exemplary environment, as well as in other environments.

Exemplary Environment

FIG. 1 illustrates an environment 100 in an exemplary implementation that is configured to employ techniques to manage streaming content. Although the environment 100 of FIG. 1 is illustrated as an IP-based television (IPTV) environment, the environment 100 may assume a wide variety of other configurations, such as a traditional television broadcast environment, a broadcast environment with back-channel communication capabilities, and so on.

The environment 100 includes a content provider 102 (which may be representative of multiple content providers) and a viewing system 104 that can include any number of client devices, which are illustrated as client devices 106(1)-106(N). The viewing system 104 is illustrated as being implemented at a particular location (i.e., premises) that has several viewing areas (e.g., different rooms) for viewing content, such as television programming. Although the viewing system 104 is depicted as employed at a particular location (e.g., the household), it should be apparent that the viewing system 104 may also be employed in multiple locations (i.e., premises) without departing from the spirit and scope thereof.

The viewing system 104 is configured for communication with the content provider 102 via a communication network 108 which, in this example, is an IP-based network. The content provider 102 is illustrated as including a variety of content 110(c) (where "c" can be any integer from one to "C") that is stored in storage 112, e.g., a computer-readable medium.

The content 110(c) may be configured for distribution over the communication network 108 (e.g., through execution of a content manager module 114) in a variety of ways. For example, the content 110(c) may include any form of television programs, commercials, music, movies, video on-demand (VOD), pay-per-view (PPV), movies and other media content, recorded media content, interactive games, network-based applications, and any other similar audio, video, and/or image content. In addition, content 110(c) in general may include music streamed from a computing device to one or more of the client devices 106(1)-106(N), such as a television-based set-top box, and may also include video on-demand (VOD) media content delivered from a server, a photo slideshow, and any other audio, video, and/or image content received from any type of content source.

To control consumption of the content 110(c) received from over the communication network 108 (as well as content that is available locally), each of the client devices 106(1)-106(N) is illustrated as including a respective content module 116(1)-116(N). The content modules 116(1)-116(N) are executable to provide a wide variety of functionality related to content output. For example, the content modules 116(1)-116(N) may be executed to communicate with the content provider 102 (and more particularly the content manager module 114) to request particular content 110(c). For instance, the content module 116(1), when executed, may provide authentication and billing information to order VOD, PPV, and so on. In another example, the content modules 116(1)-116(N) are executable to decompress and decrypt content 110(c) received from the communication network 108 and provide other digital rights management functionality. A variety of other examples are also contemplated.

Client device 106(1), for instance, is illustrated as being implemented by a set-top box 118 that is communicatively coupled to a display device 120, such as any type of television, monitor, or similar television-based display system that renders audio, video, and/or image data. Client 106(1) is also illustrated as including time-shifting (e.g., digital video recorder (DVR)) functionality. For example, client device 106(1), through execution of the content module 116(1), may record content 110(c) received from the content provider 102 over the communication network 108 in storage 122 as content 124(o), where "o" can be any integer from one to "O". Therefore, client device 106(1) may output the content 124(o) from storage 122 at a later time as desired by a user of the client device 106(1). Further, the client device 106(1) (e.g., through execution of the content module 116(1)) may provide other time-shifting functionality, such as "pausing" an output of the content 124(o) (e.g., by pausing playback of content 124(o) through use of the storage 122 as a pause buffer), "rewinding" an output of the content 124(o) (e.g., by streaming an "earlier" portion of the content 124(o)), and so on.

The viewing system 104 may also utilize a variety of other techniques to store content. For example, the storage 122 may be implemented as an independent component of the viewing system 104 and connected to the manager client device 106 (1). Alternatively, the storage 122 may be implemented as a component of the manager client device 106(1) as illustrated, which manages storage of content 124(o) initiated from any of the other remote client devices 106(2) 106(N). In yet another embodiment, the storage may be a distributed recording system where any one or more of the client devices 106(1)-106(N) include recording media that is centrally managed by the manager client device 106(1). In still yet another embodiment, the storage 122 may be implemented by the content provider 102 (e.g., when configured as a head end) and managed by the manager client device 106(1) as a "network digital video recorder" (NDVR). In other words, the storage 122 may also be provided as a "drive in the sky" that is responsive to one or more client devices 106(1)-106(N).

Although a few examples of client devices 106(1)-106(N) have been described, the client devices 106(1)-106(N) may also be configured in a wide variety of other ways, such as wireless phones, game consoles, "media centers", and so on. For example, client device 106(N) is illustrated in FIG. 1 as a set-top box that does not include DVR functionality, unlike client device 106(1) of FIG. 1. Thus, the client devices 106 (1)-106(N) may be implemented in a variety of different ways to provide different amounts of functionality (i.e., "thin" or "thick" devices) with any number and combination of differing components, an example of which is further described with reference to the exemplary client device 106(n) shown in FIG. 6. Likewise, the environment 100 may be implemented with any number and combination of differing components, an example of which is described below with reference to the exemplary entertainment and information system 700 shown in FIG. 7.

Content 110(c) may be allocated to the client devices 106 (1)-106(N) by the content provider 102 in a variety of ways. For example, each premises (e.g., the illustrated household) may be allocated a certain amount of bandwidth by the content provider 102. The premises may then use one or more techniques to determine which clients 106(1)106(N) receive portions of the allocated bandwidth. In other words, the viewing system 104, itself, may allocate which portion of the bandwidth allocated to viewing system 104 is provided to particular client devices 106(1)-106(N).

In the exemplary viewing system 104, for instance, client device 106(1) is depicted as a "manager" client device that is responsible for allocating streams of content, thereby managing distribution of the data streams to one or more of the other "remote" client devices, such as client device 106(N). Thus, the "manager" client device 106(1) in this instance manages content 110(c) consumption within the viewing system 104, which may be performed using a variety of techniques.

Each of the client devices 106(1)-106(N), for instance, may maintain tokens that determine which of the client devices 106(1)-106(N) are authorized to receive content 110(c) from the content provider 102. Tokens may be configured in a variety of ways, such as an abstract representation of permission to consume content, a programmable-object representing a content stream itself (e.g., a token is a stream object itself), and so on. The "remote" client device 106(N), for example, may connect to the manager client device 106(1) to receive a data stream for live television, delayed program viewing, and/or recorded DVR playback. In another example, the remote client device 106(N) may receive the content 110(c) directly from the communication network 108 (e.g., without "going through" the manager client device 106(1)) but is authorized to do so when the client 106(N) has a token that is approved by the manager client device 106(1). A variety of other examples are also contemplated. Thus, the manager client device 106(1) may arbitrate which client devices 106(1)-106(N), including the manager client device 106(1) itself, are authorized to receive and/or output the content 110(c).

As previously described, different client devices 106(1)-106(N) may include different functionality, one to another. For example, client device 106(1) (i.e., the "manager") manages content consumption in the viewing system 104 as well as recordation of content 124(o) in storage 122. Because the storage 122 may provide a wide variety of functionality, this functionality may be shared such that client devices that do not have storage (e.g., client device 106(N)) may interact with the client device 106(1) that does have storage. For example, client device 106(1), through execution of content module 116(1), may stream content 124(o) to the client device 106(N) that is received from the content provider 102 over the communication network 108. Client device 106(N), through execution of content module 116(N), may then communication with the client device 106(1) (i.e., the "manager") to time-shift the streaming of the content 124(o). Therefore, the remote client device 106(N) may avail itself of the functionality available via the manager client device 106(1).

Additionally, techniques may be employed to efficiently manage content provided to the client devices 106(1)-106(N). As previously described, rather than limit the remote client device 106(N) to reception of content streamed indirectly through the manager client device 106(1), the client device 106(N) may also receive content 110(c) streamed directly from the content provider 102 over the communication network 108. In this example, the remote client device 106(N) may also receive content 124(o) streamed indirectly from the content provider 102 through storage 122 of the manager client device 106(1).

Techniques may be employed that leverage the different sources of streamed content to provide functionality, such as "fast channel changing". For instance, content 110(c) (e.g., a television program) may be initially streamed in a unicast directly from the content provider 102 to the client device 106(N). The content 110(c) may also be streamed in a multicast to both the manager client device 106(1) and the remote client device 106(N). Therefore, the client device 106(N) may receive the content 110(c) directly from the content provider 102 when efficiency is desired (such as when changing between channels) and/or may receive content indirectly through the manager client device 106(1), e.g., when desiring the use of time-shifting functionality. Further discussion of management of streaming content may be found in relation to FIGS. 2-4 and further discussion of exemplary systems which may be employed in the exemplary environment 100 may be found in relation to FIGS. 5-7.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the streaming content management techniques described below are platform-independent, meaning that the techniques may be implemented on a variety of commercial computing platforms having a variety of processors.

Exemplary Procedures

The following discussion describes streaming content management techniques that may be implemented utilizing the systems and devices described in relation of FIGS. 1 and 5-7. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 2:
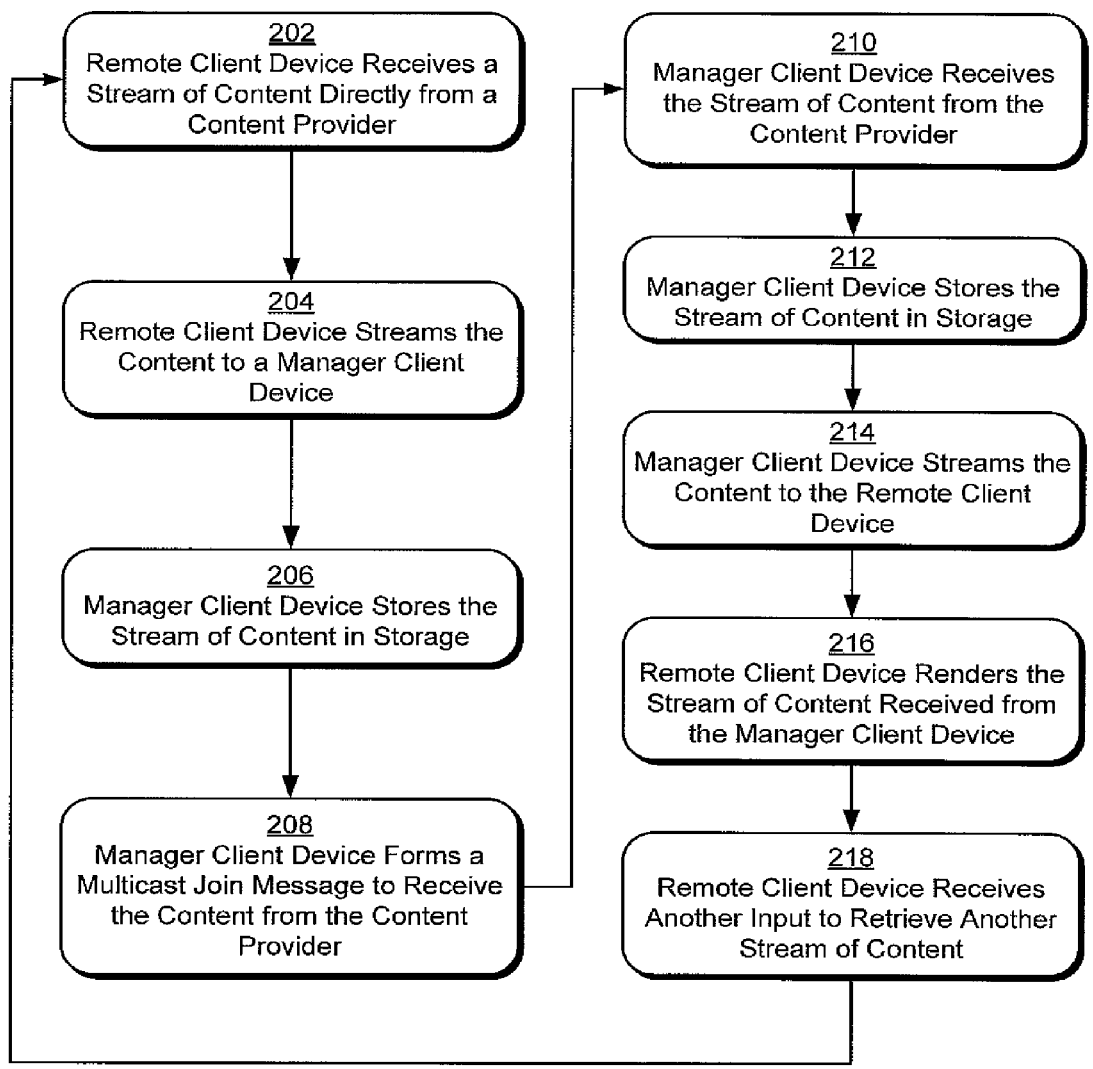
FIG. 2 is a flow diagram depicting a procedure in an exemplary implementation in which streams of content originated by a content provider of FIG. 1 over a communication network are managed to share functionality and efficiently access content from the content provider.

FIG. 2 depicts a procedure 200 in an exemplary implementation in which streams of content originated by a content provider over a communication network are managed to share functionality and efficiently access content from the content provider of FIG. 1. In the discussion of FIG. 2, reference will also be made to a system 300 depicted in FIG. 3 which includes the content provider 102, client devices 106(1), 106(N) and communication network 108 of FIG. 1. The arrows of FIG. 3 correspond to the blocks of FIG. 2 and thus matching reference numbers are used in the figures for the sake of clarity in the discussion.

A remote client device receives a stream of content directly from a content provider (block 202). For example, the remote client device 106(N) may receive content 110(c) (e.g., a television program) that is streamed over the communication network 108 to the client device 106(N) for rendering by the client device 106(N).

The remote client device 106(N) also streams the content to a manager client device 106(1) (block 204). The remote client device 106(N), for instance, may stream the content 110(c) as it is received to the manager client device 106(1) such that the manager client device 106(1) may store the content in storage (block 206), e.g., as content 124(o) in storage 122. In this way, the remote client device 106(N) may avail itself of functionality that is available from the manager client device 106(1) but not the remote client device 106(N) (e.g., time-shifting of content 124(*o*)) provided by the manager client device 106(1). In another instance, the remote client device, for example, may request upon tuning to content 110(*c*) that another client device (e.g., the manager client device) also tune to the content 110(*c*) and store the content 110(*c*), e.g., to provide time-shifting operations. Thus, the other client device in this example (e.g., the manager client device) does not receive the content from the remote client device, but rather directly from the content provider. A variety of other instances are also contemplated.

Continuing with the first instance, the manager client device, in response to reception of the streaming content, forms a multicast join message to receive the content from the content provider (block 208). For example, the manager client device 106(1), through execution of the content module 116(1), may identify the particular content stream (e.g., by headers of packets forming the stream) and include this identification in the multicast join message to be communicated to the content provider 102 over the communication network 108. In another example, the multicast join message may identify the remote client device 106(N), which may then be used by the content provider 102 to determine which content 110(*c*) is being streamed to the remote client device 106(N) by the content provider 102. A variety of other examples are also contemplated.

In response to the multicast join message, the manager client device 106(1) receives the stream of content from the content provider 102 (block 210). Additionally, because the particular data stream is multicast, the remote client device 106(N) may also continue to receive the stream of content.

The manager client device stores the stream of content in storage (block 212), such as content 124(*o*) illustrated in storage 122 at the manager client device 106(1). The manager client device also streams the content to the remote client device (block 214), which is rendered at the remote client device (block 216). For example, the remote client device 106(N), upon receipt of the stream from the manager client device, may "unjoin" a multicast of the stream received directly from the content provider 102 over the communication network 108. Therefore, the remote client device 106(N) may avail itself of functionality of the manager client device 106(1), such as to time shift the content.

When the remote client device receives another input to retrieve another stream of content (block 218), the procedure 200 may be repeated by receiving the other stream directly from the content provider (block 202). In this way, the remote client device 106(N) may quickly receive content directly from the content provider 102. Once the manager client device 106(1) receives matching content, the remote client device 106(N) may then switch to an indirect stream of the content from the manager client device 106(1) in order to utilize functionality available from the manager client device 106(1), further discussion of which may be found in relation to the following figure.

Figure 4:
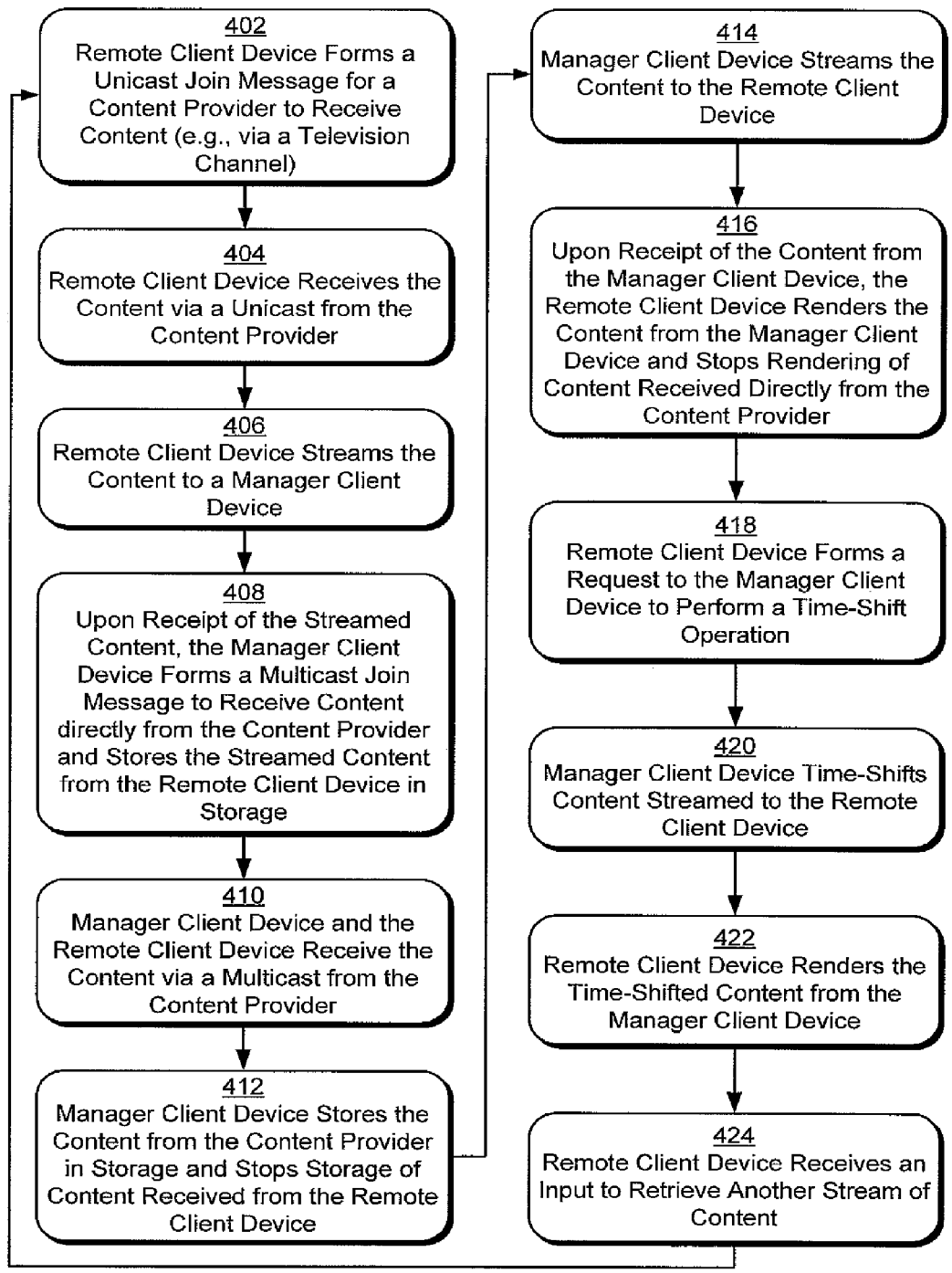
FIG. 4 is a flow diagram depicting a procedure in an exemplary implementation in which unicasting and multicasting are utilized to navigate between streams of content originated by a content provider over a communication network shown in FIG. 1.

FIG. 4 depicts a procedure 400 in an exemplary implementation in which unicasting and multicasting are utilized to navigate between streams of content originated by a content provider over a communication network. A remote client device forms a unicast join message for a content provider to receive content (block 402). For example, the unicast join message may specify content (e.g., a television program) from a particular television channel. The remote client device may therefore receive the content via a unicast from the content provider (block 404).

Upon receipt of the stream of content at the remote client device, the remote client device streams the content to a manager client device (block 406). For example, the remote client device 106(N) may stream the content to the manager client device 106(1) in the viewing system 104 over a network. Upon receipt of the streamed content, the manager client device forms a multicast join message to receive content directly from the content provider and stores the streamed content from the remote client device in storage (block 408). Thus, the manager client device may provide functionality (e.g., time shifting) to the remote client device before the manager client device receives the content directly from the content provider.

The multicast join message causes the manager client device and the remote client device to receive the content via a multicast from the content provider (block 410) simultaneously. The manager client devices stores the content from the content provider in storage and stops storage of content received from the remote client device (block 412). For example, the manager client device may account for a delay in the reception of content from the remote client device by storing content received from the remote client device until that content matches content already received directly from the content provider. A variety of other examples are also contemplated without departing from the spirit and scope thereof.

The manager client device may then stream the content to the remote client device (block 414). Upon receipt of the content from the manager client device, the remote client device renders the content from the manager client device and stops rendering of content received directly from the content provider (block 416). For example, the remote client device may form and send a request to the content provider to stop streaming content directly to the remote client device. Therefore, the remote client device 106(N) at this point receives content 110(*c*) from the content provider 102 indirectly (e.g., through another client device in the viewing system 104) through use of the manager client device 106(1). In another example, the remote client device 106(N) continues to receive content directly from the content provider 102 until functionality provided by the manager client device 106(1) is desired, such as the use of a trick mode. A variety of other examples are also contemplated.

The remote client device 106(N) may then avail itself of functionality provided by the manager client device 106(1). For example, the remote client device may then form a request for communication to the manager client device to perform a time-shift operation (block 418), such as to "pause" or "rewind" the streaming content. The remote client device may then render the time-shifted content from the manager client device (block 422), such as to "pause" rendering of a stream of content. A variety of other examples are also contemplated.

The procedure 400 may continue such that should the remote client device receive an input to retrieve another stream of content (block 424), the remote client device forms another unicast join message for communication to the content provider to receive content (block 402). Thus, the remote client device 106(N) may receive the desired content directly from the content provider 102, and does not encounter a delay of indirect communication of the content through the manager client device 106(1).

Exemplary Systems

Figure 5:
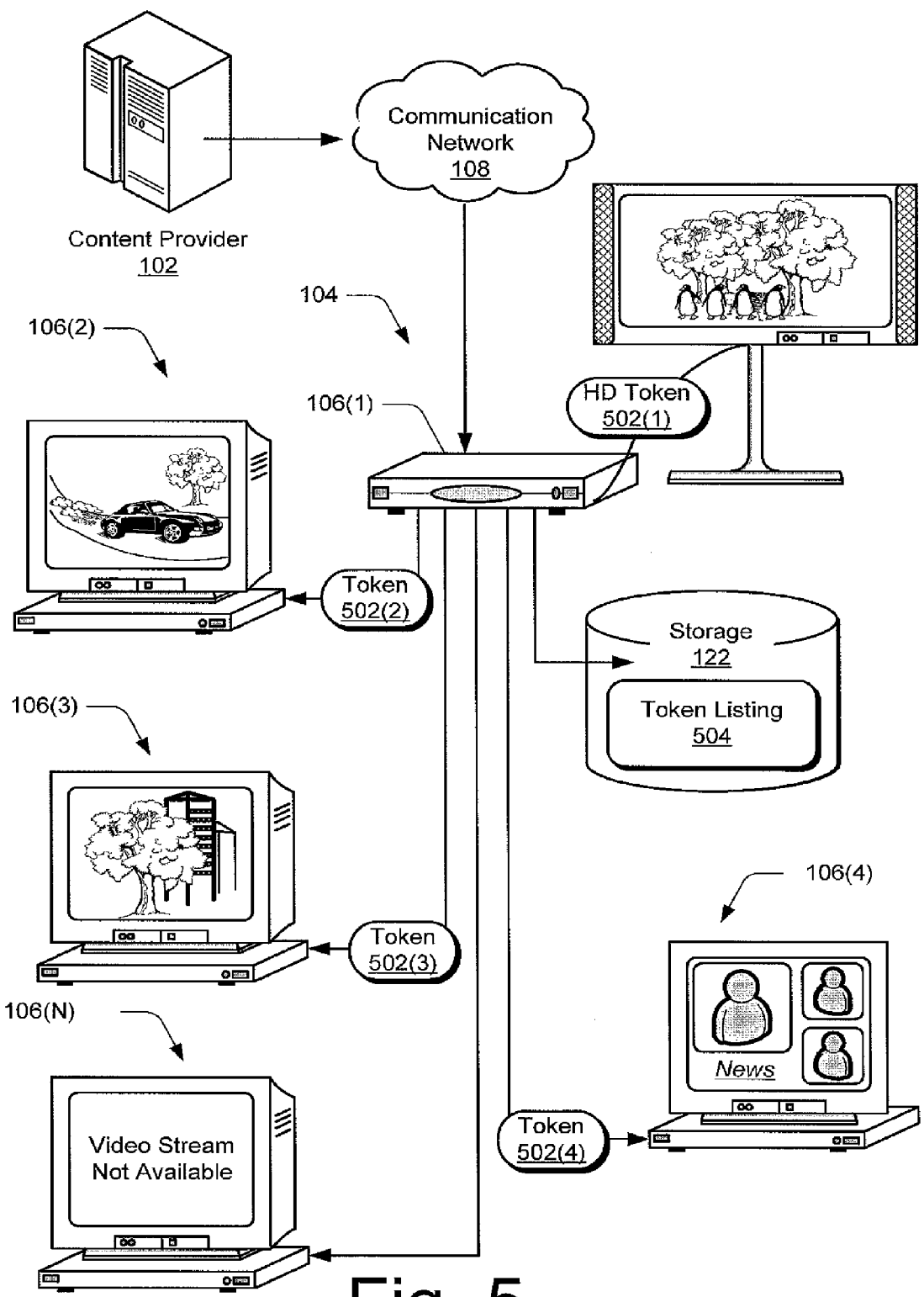
FIG. 5 illustrates an exemplary implementation of a system showing allocation of content from the content provider by a viewing system of FIGS. 1 and 3 in greater detail.

FIG. 5 illustrates an exemplary implementation of a system 500 showing allocation of content from the content provider 102 by the viewing system 104 of FIG. 1 in greater detail. The illustrated viewing system 104 includes a plurality of client devices 106(1), 106(2), 106(3), 106(4) and 106(N). In this system, the master client device 106(1) arbitrates control of four (4) data streams from the content provider 102 via the communication network 108. For example, the data streams may be obtained by the remote clients 106(2)-106(N) through the manager client device 106(1). In another example, the data streams are managed by the manager client device 106(1), but the remote client devices 106(2)-106(N) receive the streams directly from the communication network 108. A variety of other examples are also contemplated.

Although the data streams are not shown specifically, the illustrated communication links illustrate various communication links which are configured to communicate the data streams. Additionally, the communication links are not intended to be interpreted as a one-way communication link, but rather may also represent two-way communication. A viewing selection from a first data stream is shown for viewing on display device at the manager client device 106(1). A second data stream is illustrated as directed from the master client device 106(1) to the remote client device 106(2). Similarly, a third data stream is directed from the master client device 106(1) to the remote client device 106(3) and a viewing selection from the third data stream is shown for viewing on a respective display device. Likewise, a fourth data stream is directed from the master client device 106(1) to the remote client device 106(4) and a viewing selection from the fourth data stream is shown for viewing on a respective display device.

The available bandwidth for the viewing system 104, however, may not be able to accommodate as many data streams as there are client devices. As illustrated in FIG. 2, for instance, it is not unusual for a household to have five (5) or more televisions in various rooms and at various locations throughout the house. In this instance, the number of client devices exceeds the number of data streams allocated to the viewing system 104 from the content provider 102. For example, the viewing system 104 is depicted as including at least a fifth client device 106(N) of the viewing system 104. The corresponding display device of the client device 106(N) indicates that a video stream is not available, because the data streams allocated to the viewing system 104 (e.g., the four data streams) have already been directed to the other client devices 106(1)-106(4).

In the illustrated system 500 of FIG. 5, a technique is shown which utilizes tokens 502(1)-502(4) to arbitrate control of which of the client devices 106(1)-106(N) of the viewing system 104 are authorized to receive content 110(*c*) of FIG. 1 from the content provider 102. For example, each of the "remote" client devices 106(2)-106(N) may communicate with the manager client device 106(1) to receive a respective token 502(1)-502(4) that enables the respective remote client device 106(2)-106(N) to output the content 110(*c*). The manager client device 106(1), for instance, may maintain a token listing 504 in storage 122 which lists which tokens 502(1)-502(4) have been provided to which respective client devices 106(1)-106(4). It should be noted that the manager client device 106(1) also uses a token to consume content. In the illustrated example, because client device 106(N) does not include one of the tokens 202(1)-202(N), the client device 106(N) is not authorized to output content 110(*c*) from the content provider 102. A variety of techniques may be utilized to determine which clients receive tokens at a particular time, such as a priority listing, random number comparison (e.g., each client generates a random number with the "higher" or "lower" number indicating who "wins" and is thus authorized to output content 110(*c*)), and so on such as whether the content cost money (e.g., PPV or VOD), how long the client device has been tuned to a channel without user activity. etc.

The data streams allocated by the content provider 102 to the viewing system 104 may be configured in a variety of ways, such as a combination of high definition and/or standard definition data streams. For example, the viewing system 104 may receive one (1) high definition (HD) data stream and three (3) standard definition (SD) data streams depending upon available bandwidth to deliver the data streams. As more bandwidth becomes available, the viewing system 104 may receive more high definition and/or standard definition data streams. Accordingly, the tokens 502(1)-502(4) may be configured to allocate these particular types of data streams. For example, token 502(1) is illustrated as an "HD token" and therefore a client device having that token 502(1) (e.g., the manager client device 106(1) in the illustration of FIG. 2) is authorized to receive and/or output the HD data stream. Because the other client devices 106(2)-106(4) do not have the HD token, however, these devices are restricted in this instance to receive and/or output a standard definition data stream. A variety of other examples are also contemplated.

Thus, in the system 500 of FIG. 5, the manager client device 106(1) is responsible for controlling which clients are authorized to output data streams from the content provider 102. In some instances, however, the particular client device (e.g., the manager client device 106(1)) may not be available to perform this function, such as due to a network, hardware and/or software error. Accordingly, techniques may be employed in order to authorize another one of the client devices (e.g., client devices 106(2)-106(N)) to act as the manager. For example, one of the remote client devices (e.g., clients 106(2)-106(N)) may assume the role of a "limited manager" that manages allocation of the data streams until the manager (e.g., client device 106(1)) is available. Thus, the viewing system 104 is still able to arbitrate usage of the data streams in the event of unavailability (e.g., failure) of one or more of the client devices 106(1)-106(N).

The manager, and consequently the limited manager, may also be configured to provide additional functionality to the viewing system 104. For example, the manager client device 106(1) may be configured to control content recordation performed by the viewing system 104, whether the recordation occurs locally at the manager, distributed across the viewing system 104, remotely as a network digital video recorder (NDVR), and so on. In another example, the manager client device 106(1) may act as a "playback service" such that the remote client devices 106(2)-106(N) may request content from the manager client device 106(1), e.g., to stream content 124(*o*) from storage. In a further example, the manager client device 106(1) may manage consumption of content for recording purposes also, e.g., to show a notification to the remote devices that, if not answered, causes the respective token to be removed for use by the manager client device 106(1) to record content. A variety of other examples are also contemplated.

Figure 6:
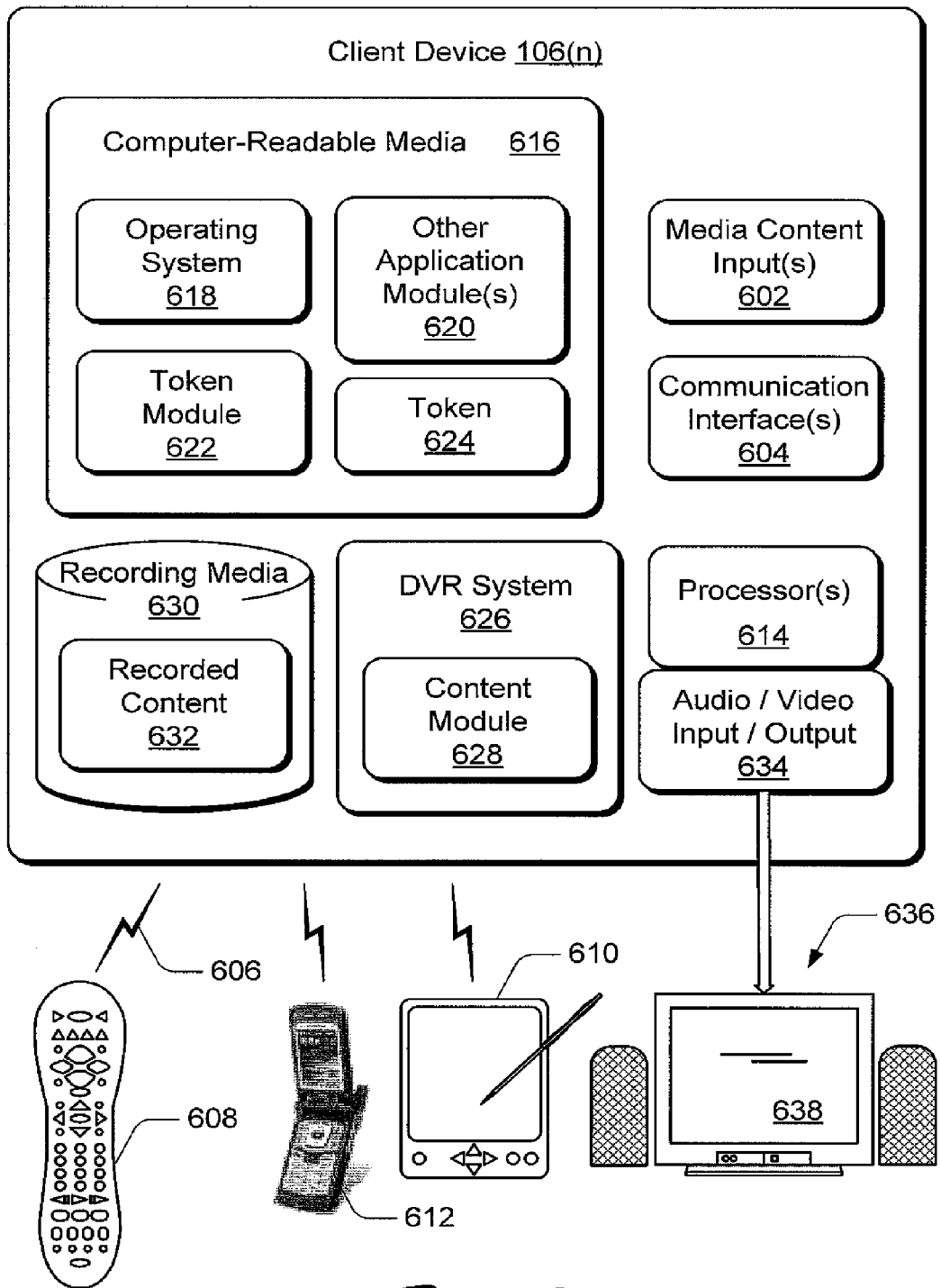
FIG. 6 illustrates an exemplary implementation of a client device of FIGS. 1 and 3 in greater detail.

FIG. 6 illustrates an exemplary implementation 106(*n*) of a client device 106(*n*) (which may or may not correspond to one or more of the client devices 106(1)-106(N) of FIG. 1) in greater detail. The client device 106(*n*) may be implemented as any form of a computing, electronic, and/or television-based client device.

Client device 106(*n*), as illustrated in FIG. 6, includes one or more media content inputs 602 which may include Internet Protocol (IP) inputs over which streams of media content are received via an IP-based network. Client device 106(*n*) further includes communication interface(s) 604 which can be implemented as any one or more of a serial and/or parallel interface, a wireless interface, any type of network interface, a modem, and as any other type of communication interface.

A wireless interface enables client device 106(n) to receive control input commands 606 and other information from an input device, such as from remote control device 608, PDA (personal digital assistant) 610, cellular phone 612, or from another infrared (IR), 802.11, Bluetooth, or similar radio frequency (RF) input device.

A network interface provides a connection between the client device 106(n) and a communication network by which other electronic and computing devices can communicate data with the client device 106(n). Similarly, a serial and/or parallel interface provides for data communication directly between client device 106(n) and the other electronic or computing devices. A modem facilitates client device 106(n) communication with other electronic and computing devices via a conventional telephone line, a digital subscriber line (DSL) connection, cable, and/or other type of connection.

Client device 106(n) also includes one or more processors 614 (e.g., any of microprocessors, controllers, and the like) which process various computer executable instructions to control the operation of client device 106(n), such as to communicate with other electronic and computing devices. Client device 106(n) can be implemented with computer-readable media 616, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like. It should be apparent that although a single computer-readable media 616 is illustrated, the computer readable media 616 may be representative of multiple types and combinations of computer-readable media.

Computer-readable media 616 provides data storage mechanisms to store various information and/or data such as software applications and any other types of information and data related to operational aspects of client device 106(n). For example, an operating system 618 and/or other application modules 620 can be maintained as software applications with the computer-readable media 616 and executed on the processor(s) 614.

For example, one or more of the other application modules 620 can be implemented as a program guide application that processes program guide data and generates program guides for display. The program guides enable a viewer to navigate through an onscreen display and locate broadcast programs, recorded programs, video-on-demand (VOD), movies, interactive game selections, network-based applications, and other media access information or content of interest to the viewer. Likewise, the computer-readable media 616 may also store a token module 622 and/or tokens 624 that are used to allocate bandwidth in the viewing system 104 as previously described in relation to FIG. 5. The client device 106(n) may also include a DVR system 626 with the content module 628 (which may or may not correspond to the content modules 116(1)-116(N) of FIG. 1) and recording media 660 (which may or may not correspond to the storage 122 of FIG. 1) to maintain recorded content 632.

The client device 106(n), as illustrated, also includes an audio and/or video input/output 634. The audio/video input/output 634 may be utilized for a variety of purposes, such as to provide audio and video to an audio rendering and/or display system 636 and/or to other devices that process, display, and/or otherwise render audio, video, and image data. Video signals and audio signals, for instance, may be communicated from client device 106(n) to a television 638 (or to other types of display devices) via an RF (radio frequency) link, S-video link, composite video link, component video link, analog audio connection, or one or more other such communication links.

Figure 3:
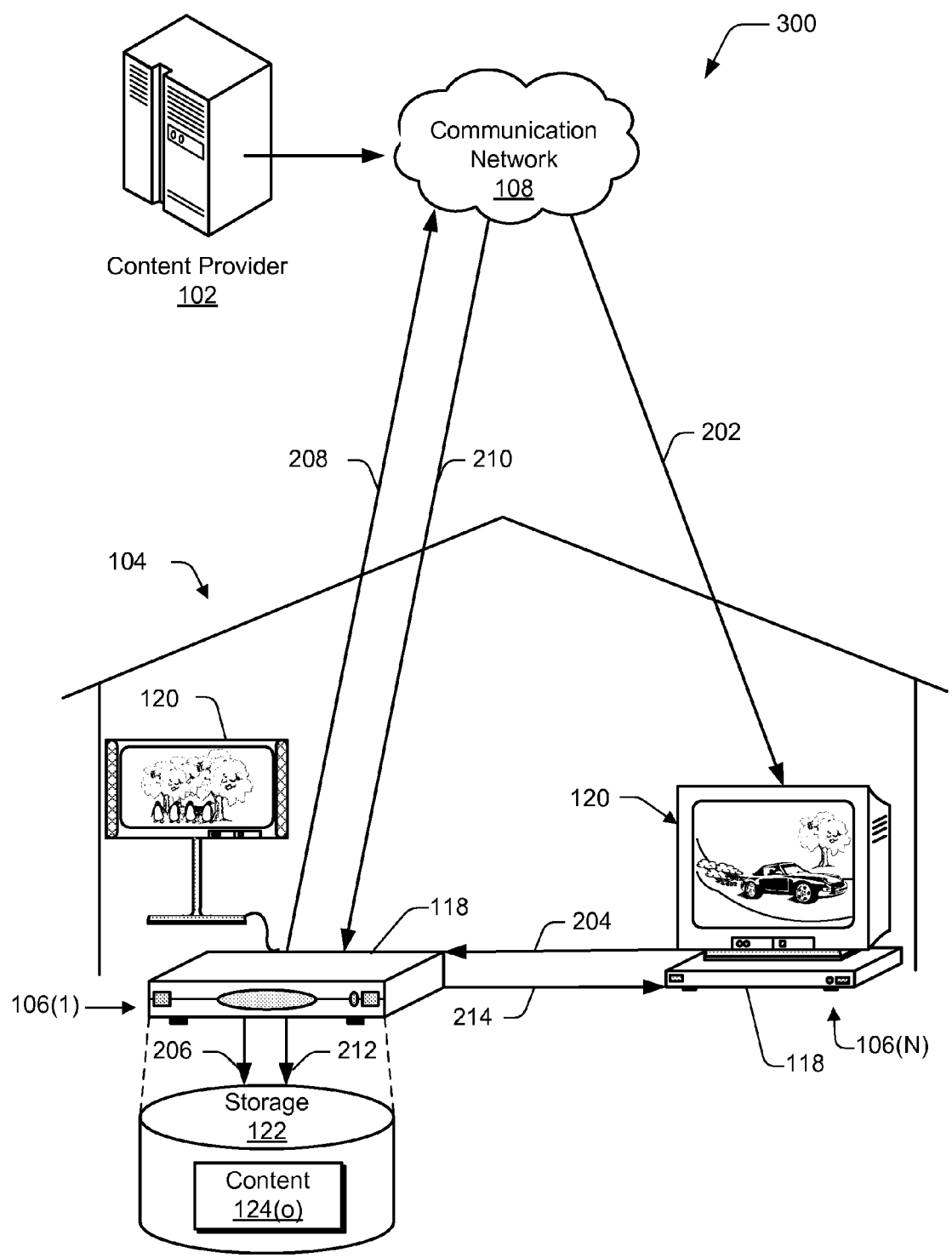
FIG. 3 is an illustration in an exemplary implementation of a system showing the content provider, client devices and communication network of FIG. 1 as performing the techniques of FIG. 2.
Figure 7:
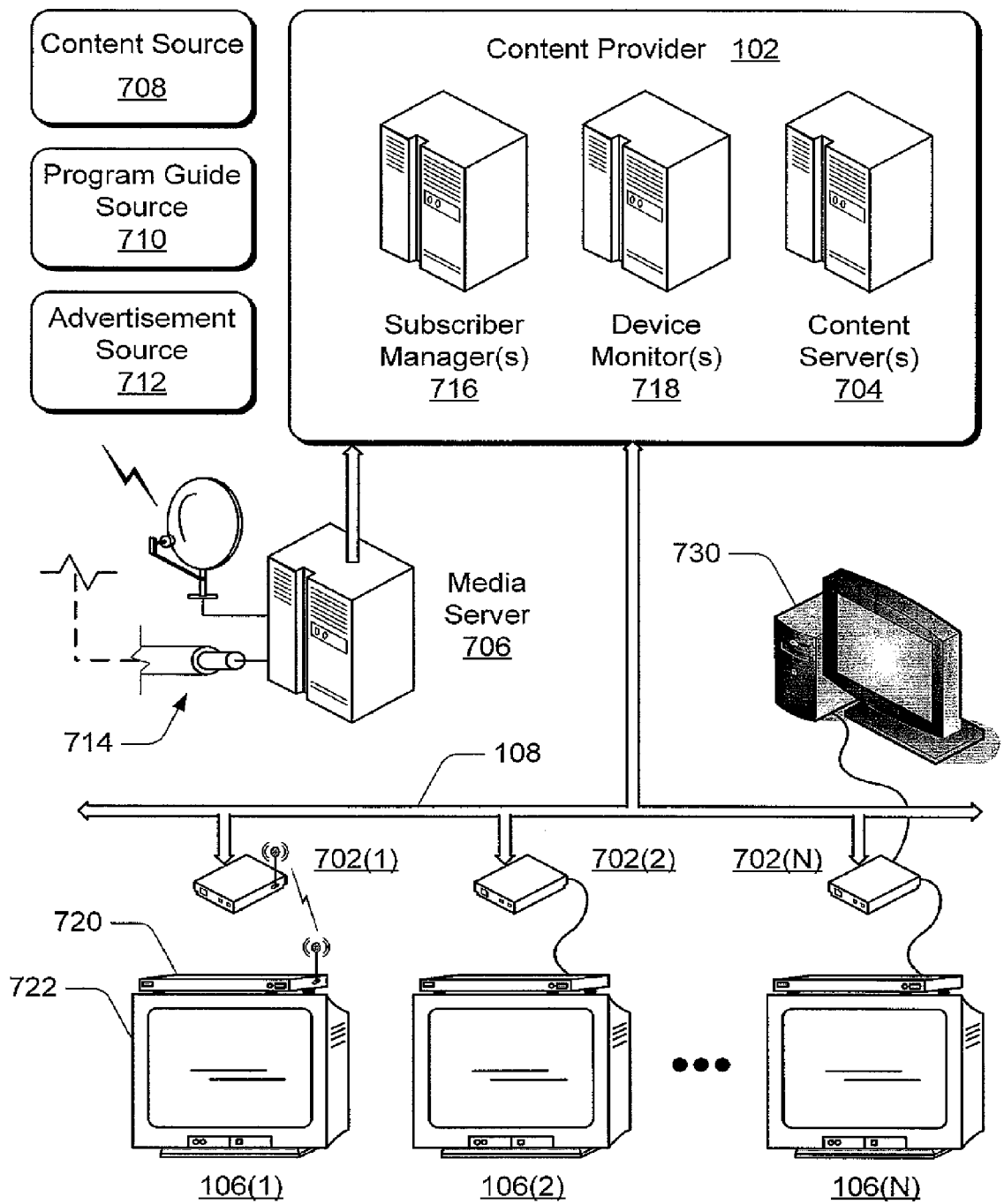
FIG. 7 illustrates a system in an exemplary implementation in which a content provider of FIGS. 1 and 3 is shown in greater detail.

FIG. 7 illustrates a system 700 in an exemplary implementation in which the content provider 102 of FIGS. 1 and 3 is shown in greater detail. System 700 facilitates the distribution of content, such as television program content, program guide data, and advertising content to multiple viewers and to multiple viewing systems. System 700 includes the content provider 102 and the plurality of client devices 106(1)-106(N), each being configured for communication via an IP-based communication network 108. The manager client device 106 (1), for instance, may receive one or more data streams from the content provider 102 and arbitrate stream allocation to distribute consumption of the data streams (e.g., one to each) by one or more other remote client devices 106(2)-106(N) in the viewing system 104.

The communication network 108 may be implemented in a wide variety of ways, such as a wide area network (e.g., the Internet), an intranet, a Digital Subscriber Line (DSL) network infrastructure, a point-to-point coupling infrastructure, and so on. Additionally, the communication network 108 can be implemented using any type of network topology and any network communication protocol, and can be represented or otherwise implemented as a combination of two or more networks. A digital network can include various hardwired and/or wireless links 702(1)-702(N), routers, gateways, and so on to facilitate communication between content provider 102 and the client devices 106(1)-106(N). The client devices 106(1)-106(N) receive content (e.g., television programs, program guide data, advertising content, closed captions data, and the like) from content server(s) 704 of the content provider 702 via the communication network 108.

System 700 may also include a variety of servers to provide functionality, such as to obtain and provide specific types of content. For example, the illustrated system 700 includes a media server 706 that receives television program content from a content source 708, program guide data from a program guide source 710, and advertising content from an advertisement source 712. In an embodiment, the media server 706 represents an acquisition server that receives the audio and video program content from content source 708, an EPG server that receives the program guide data from program guide source 710, and/or an advertising management server that receives the advertising content from the advertisement source 712.

The content source 708, the program guide source 710, and the advertisement source 712 control distribution of the program content, the program guide data, and the advertising content to the media server 706 and/or to other servers. The program content, program guide data, and advertising content is distributed via various transmission media 714, such as satellite transmission, radio frequency transmission, cable transmission, and/or via any number of other wired or wireless transmission media. In this example, media server 706 is shown as an independent component of system 700 that communicates the program content, program guide data, and advertising content to content provider 102. In an alternate implementation, media server 706 can be implemented as a component of content provider 102.

Content provider 102 in the system 700 of FIG. 7 is representative of a headend service in a television-based content distribution system, for example, that provides the program content, program guide data, and advertising content to multiple subscribers, e.g., the client devices 106(1)-106(N). The content provider 102 may be implemented in a variety of ways, such as a satellite operator, a network television operator, a cable operator, and the like to control distribution of program and advertising content, such as movies, television programs, commercials, music, and other audio, video, and/or image content to the client devices 106(1)-106(N).

Content provider 102 includes various components to facilitate content processing and distribution, such as a subscriber manager 716, a device monitor 718, and the content server 704. The subscriber manager 716 manages subscriber data, and the device monitor 718 monitors the client devices 106(1)-106(N) (e.g., and the subscribers), and maintains monitored client state information.

Although the various managers, servers, and monitors of content provider 102 (to include the media server 706 in an embodiment) are illustrated and described as distributed, independent components of content provider 102, any one or more of the managers, servers, and monitors can be implemented together as a multi-functional component of content provider 102.

The client devices 106(1)-106(N), as previously described, may be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client device 106(N) is implemented via a computing device. Additionally, any of the client devices 106(1)-106(N) can implement features and embodiments of management techniques as described herein.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a manager client device by a processor configured to execute instructions that, when executed by the processor, direct the manager client device to perform acts comprising:
   receiving a broadcast of multimedia content at the manager client device indirectly from a content provider via a remote client device;
   responsive to the receiving, transmitting a request from the manager client device to the content provider for the multimedia content received via the remote client device;
   obtaining the multimedia content at the manager client device from the content provider and not via the remote client device;
   upon receipt of a request for the multimedia content from the remote client device, streaming the multimedia content obtained from the content provider and not via the remote client device to the remote client device, wherein the remote client device unjoins the broadcast of multimedia content from the content provider and renders the streaming multimedia content received from the manager client device instead of the broadcast of multimedia content from the content provider.

2. A method as described in claim 1, wherein the manager client device initially receives the broadcast of multimedia content that the remote client device received in a unicast from the content provider over a communication network.

3. A method as described in claim 1, wherein the request from the manager client device to the content provider for the multimedia content received via the remote client device is a multicast join message which causes the content provider to stream the multimedia content to the manager client device and to the remote client device.

4. A method as described in claim 1, further comprising:
   receiving another broadcast of multimedia content at the manager client device indirectly from a content provider via the remote client device responsive to the remote client device performing acts comprising:
   receiving an input from a user to retrieve another stream of multimedia content;
   sending a unicast join message to the content provider requesting the another broadcast of multimedia content; and
   receiving the multimedia content via a unicast from the content provider.

5. A method as described in claim 1, further comprising:
   storing the multimedia content on the manager client device, wherein storing multimedia content received via the remote client device is stopped and instead storing of the multimedia content received from the content provider and not via the remote client device is started responsive to obtaining the multimedia content from the content provider and not via the remote client device.

6. A method as described in claim 1, further comprising performing a time-shifting function in the streaming of the multimedia content obtained from the content provided and not via the remote client device to the remote client device.

7. A method as described in claim 6, wherein the time-shifting function is a pause, skip-back, fast forward, jump ahead or a rewind.

8. A method as described in claim 1, further comprising allocating multimedia content consumption in a viewing system that includes at least the manager client device and the remote client device, wherein the manager client device maintains tokens that determine if the remote client device is authorized to receive the multimedia content.

9. A method implemented on a remote client device by a processor configured to execute instructions that, when executed by the processor, direct the remote client device to perform acts comprising:
   during receipt of a first content at the remote client device streamed from a manager client device, receiving an input to retrieve a second content;
   transmitting a unicast join message from the remote client device to a content provider, wherein the unicast join message specifies the second content;
   receiving a unicast stream of the second content from the content provider;
   streaming the second content from the remote client device to the manager client device, wherein
   the manager client device stores the second content in a storage and;
   the manager client device transmits a multicast join message to the content provider such that the content provider streams
   the second content via a multicast to both the manager client device and the remote client device simultaneously; and
   receiving the second content from the storage of the manager client device instead of from the content provider.

10. A method as described in claim 9, further comprising performing a time-shifting function in the streaming of the content from the manager client device to the remote client device.

11. One or more computer-readable storage media comprising computer executable instruction that, when executed, direct a remote client device to perform acts comprising:
- forming a message for communication to a content provider to receive a stream of content from the content provider;
- receiving the stream of content from the content provider;
- up on receipt of the stream of content from the content provider, render the stream of content on a display device and stream the content to a manager client device, wherein the manager client device stores the stream of content in a storage;
- upon receipt of a request from a user to perform a time-shift operation on the stream of content, forming a request for communication to the manager client device to perform the time-shift operation;
- receiving a stream of content from the storage; and
- rendering the stream of content from the storage on the display device instead of the stream of content from the content provider.

12. One or more computer-readable storage media as described in claim 11, wherein the time-shift operation comprises a pause, a skip-back a fast forward, a jump ahead, or a rewind.

13. One or more computer-readable storage media as described in claim 11, wherein the stream of content is a television program.

14. One or more computer-readable storage media as described in claim 11, wherein the receipt of the stream of content at the manager client device from the remote client device causes the manager client device to transmit a message to the content provider to cause the content provider to stream the content to the manager client device and the remote client device simultaneously in a multicast.

15. One or more computer-readable media comprising computer executable instruction that, when executed, direct a manager client device to:
- provide time-shifting content streaming to a remote client device, stream content received from a content provider to the remote client device, wherein the content matches content originally received by the manager client device from the content provider via the remote client device.

16. The method of claim 9 further comprising:
- upon receipt of the second content from the storage of the manager client device, rending the second content received from the storage of the manager client device;
- stopping rendering of the stream of second content received directly from the content provider;
- transmitting a request to the manager client device to perform a time-shift operation, wherein time-shift operation is provided through use of the storage of the manager client device;
- receiving a time-shifted content from the manager client device; and
- rendering the time-shifted content.

* * * * *

UNITED STATES PATENT AND TRADEMARK OFFICE
CERTIFICATE OF CORRECTION

| | | |
|---|---|---|
| PATENT NO. | : 7,634,652 B2 | |
| APPLICATION NO. | : 11/275530 | |
| DATED | : December 15, 2009 | |
| INVENTOR(S) | : Elizabeth Rose McEnroe et al. | |

It is certified that error appears in the above-identified patent and that said Letters Patent is hereby corrected as shown below:

In column 14, line 59, in Claim 9, after "and" delete ";".

In column 15, line 12, in Claim 11, delete "up on" and insert -- upon --, therefor.

In column 15, line 27, in Claim 12, after "skip-back" insert -- , --.

Signed and Sealed this

Seventeenth Day of May, 2011

David J. Kappos
*Director of the United States Patent and Trademark Office*